(12) United States Patent
Gupta et al.

(10) Patent No.: US 9,465,693 B2
(45) Date of Patent: Oct. 11, 2016

(54) SELF-DESCRIBING DATA BLOCKS OF A MINIMUM ATOMIC WRITE SIZE FOR A DATA STORE

(71) Applicant: Amazon Technologies, Inc., Seattle, WA (US)

(72) Inventors: Anurag Windlass Gupta, Atherton, CA (US); James McClellan Corey, Seattle, WA (US); Yan Valerie Leshinsky, Kirkland, WA (US); Pradeep Jnana Madhavarapu, Mountain View, CA (US); Samuel James McKelvie, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/727,644

(22) Filed: Jun. 1, 2015

(65) Prior Publication Data
US 2015/0261610 A1    Sep. 17, 2015

Related U.S. Application Data

(63) Continuation of application No. 13/903,674, filed on May 28, 2013, now Pat. No. 9,047,189.

(51) Int. Cl.
*G11C 29/00* (2006.01)
*G06F 11/10* (2006.01)
(Continued)

(52) U.S. Cl.
CPC ........... *G06F 11/1076* (2013.01); *G06F 3/064* (2013.01); *G06F 3/0619* (2013.01); *G06F 3/0689* (2013.01); *G06F 11/0787* (2013.01); *G06F 11/10* (2013.01); *G06F 11/1004* (2013.01)

(58) Field of Classification Search
CPC .. G06F 11/08; G06F 11/1076; G06F 3/0619; G06F 11/0787; G06F 11/10; G06F 11/1072; G06F 11/1435; G06F 3/0631
See application file for complete search history.

(56) References Cited

U.S. PATENT DOCUMENTS 5,280,612 A    1/1994   Lorie et al.
5,471,614 A    11/1995   Kakimoto
(Continued)

FOREIGN PATENT DOCUMENTS

EP      0675451      10/1995

OTHER PUBLICATIONS

"Amazon Web Services Blog" Downloaded Apr. 30, 2013 from http://aws.typepad.com/aws/2010/1 0/amazon-rdsannouncing-read-replicas.html, Published Oct. 5, 2010 pp. 1-11.
(Continued)

*Primary Examiner* — Shelly A Chase
(74) *Attorney, Agent, or Firm* — Robert C. Kowert; Meyertons, Hood, Kivlin, Kowert & Goetzel, P.C.

(57) ABSTRACT

Self-describing data blocks of a minimum atomic write size may be stored for a data store. Data may be received for storage in a data block of a plurality of data blocks at a persistent storage device that are equivalent to a minimum atomic write size for the persistent storage device. Metadata may be generated for the data that includes an error detection code which is generated for the data and the metadata together. The data and the metadata are sent to the persistent storage device to store together in the data block. An individual atomic write operation may write together the data and the metadata in the data block. When accessed, the error detection code is applicable to detect errors. The metadata may also be applicable to determine whether the data is stored for a currently assigned purpose or a previously assigned purpose of the data block.

20 Claims, 9 Drawing Sheets

(51) Int. Cl.
*G06F 11/07* (2006.01)
*G06F 3/06* (2006.01)

(56) References Cited

U.S. PATENT DOCUMENTS

| | | | |
|---|---|---|---|
| 5,524,205 A | 6/1996 | Lomet et al. | |
| 5,530,850 A | 6/1996 | Ford et al. | |
| 5,684,944 A | 11/1997 | Lubbers et al. | |
| 5,870,758 A | 2/1999 | Bamford et al. | |
| 5,907,848 A | 5/1999 | Zaiken et al. | |
| 6,233,585 B1 | 5/2001 | Gupta et al. | |
| 6,240,413 B1 | 5/2001 | Learmont | |
| 6,615,219 B1 | 9/2003 | Bruso et al. | |
| 6,631,374 B1 | 10/2003 | Klein et al. | |
| 6,732,171 B2 | 5/2004 | Hayden | |
| 6,832,229 B2 | 12/2004 | Reed | |
| 6,976,022 B2 | 12/2005 | Vemuri et al. | |
| 7,010,645 B2 | 3/2006 | Metzier et al. | |
| 7,089,253 B2 | 8/2006 | Hinshaw et al. | |
| 7,146,386 B2 | 12/2006 | Xiao | |
| 7,305,386 B2 | 12/2007 | Hinshaw et al. | |
| 7,716,645 B2 | 5/2010 | Dolby et al. | |
| 7,747,663 B2 | 6/2010 | Atkin et al. | |
| 7,752,402 B2 * | 7/2010 | Fachan | G06F 3/0619 711/161 |
| 7,885,922 B2 | 2/2011 | Pareek et al. | |
| 7,930,271 B2 | 4/2011 | Tarbell | |
| 7,937,551 B2 | 5/2011 | Schott | |
| 7,979,670 B2 | 7/2011 | Saliba et al. | |
| 8,209,515 B2 | 6/2012 | Schott | |
| 8,255,627 B2 | 8/2012 | Blinick et al. | |
| 8,266,114 B2 | 9/2012 | Mace et al. | |
| 8,271,830 B2 | 9/2012 | Erofeev | |
| 8,289,801 B2 | 10/2012 | Smith et al. | |
| 8,301,670 B2 | 10/2012 | Revah et al. | |
| 8,326,897 B2 | 12/2012 | Butterworth et al. | |
| 8,341,128 B1 | 12/2012 | Ruggiero | |
| 8,370,715 B2 | 2/2013 | Hafner et al. | |
| 8,380,670 B2 | 2/2013 | Kuber et al. | |
| 8,392,479 B1 | 3/2013 | Pantin | |
| 8,396,831 B2 | 3/2013 | Larson et al. | |
| 8,412,689 B2 | 4/2013 | Reid et al. | |
| 8,412,752 B2 | 4/2013 | Dodge | |
| 8,429,121 B2 | 4/2013 | Pareek et al. | |
| 8,578,127 B2 * | 11/2013 | Thatcher | G06F 3/0604 711/103 |
| 2002/0107835 A1 | 8/2002 | Coram et al. | |
| 2002/0143733 A1 | 10/2002 | Mukkamalla et al. | |
| 2004/0133622 A1 | 7/2004 | Clubb et al. | |
| 2004/0249869 A1 | 12/2004 | Oksanen | |
| 2006/0294300 A1 * | 12/2006 | Lubbers | G06F 3/061 711/113 |
| 2008/0183973 A1 | 7/2008 | Aguilera et al. | |
| 2010/0050172 A1 | 2/2010 | Ferris | |
| 2010/0192131 A1 | 7/2010 | Dolby et al. | |
| 2011/0035548 A1 | 2/2011 | Kimmel et al. | |
| 2011/0161496 A1 | 6/2011 | Nicklin | |
| 2012/0041899 A1 | 2/2012 | Greene et al. | |
| 2012/0174112 A1 | 7/2012 | Vaidya et al. | |
| 2012/0191648 A1 | 7/2012 | Kuber et al. | |
| 2012/0221767 A1 | 8/2012 | Post et al. | |
| 2012/0297073 A1 | 11/2012 | Glover et al. | |
| 2012/0310985 A1 | 12/2012 | Gale et al. | |
| 2012/0310991 A1 | 12/2012 | Frantz et al. | |
| 2013/0310986 A1 | 12/2012 | Frantz et al. | |
| 2013/0036281 A1 | 2/2013 | Revah et al. | |
| 2013/0042156 A1 | 2/2013 | Srinivasan et al. | |
| 2013/0080386 A1 | 3/2013 | Dwyer et al. | |
| 2013/0080388 A1 | 3/2013 | Dwyer et al. | |
| 2013/0086129 A1 | 4/2013 | Brown et al. | |
| 2014/0281145 A1 | 9/2014 | Tomlin et al. | |

OTHER PUBLICATIONS

"Bloom Filter" Downloaded from http://en.wikipedia.org/wiki/Bioom_filter on May 15, 2013, pp. 1-12.

John Clarke "SOL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.

Jim Czuprynski "Oracle Database 11g: SOL Query Result Set Caching" published Jul. 30, 2008, downloaded May 15, 2013 from http://www.databasejournal.com/features/oracle/article.php/3760761/Oracle-Database-11 g-SQL -Query-Result-Set-Caching.htm, pp. 1-7.

"Oracle Database JDBC Developer's Guide and Reference: Chapter 20 Statement and Result Set Caching" downloaded from http://docs.oracle.com/cd/B28359_01/java.1111 b31224/stmtcach.htm via the Wayback Machine Nov. 27, 2011, pp. 1-8.

Adrian Billington "Query Result Cache in Oracle 11 g" downloaded from http:l/web.archive.org/web/20080124161135/http://www.oracle-developer.net/display.php?id=503 via the Wayback Machine Jan. 4, 2008, pp. 1-20.

Julian Dontcheff "Bloom Filters for DBAs" published Aug. 28, 2012, downloaded from http://juliandontcheff.wordpress.com/2012/08/28/bloom-filters-for-dbas/ on May 14, 2013, pp. 1-4.

Julian Dyke "Result Cache Internals" Nov. 2007, pp. 1-38.

Michele Cyran et al "Oracle Database Concepts 1 Og Release 2 (1 0.2)" Oct. 2005, pp. 1-542.

Lance Ashdown et al "Oracle Database Concepts 11g Release 2 (11.2)" Sep. 2011, pp. 1-460.

"Isolation (database systems)" downloaded from http://en.wikipedia.org/wikiIsolation_(database_systems) on May 15, 2013, pp. 1-7.

U.S. Appl. No. 13/903,674, filed May 28, 2013, Anurag Windlass Gupta, et al.

* cited by examiner

SELF-DESCRIBING DATA BLOCKS OF A MINIMUM ATOMIC WRITE SIZE FOR A DATA STORE

This application is a continuation of U.S. patent application Ser. No. 13/903,674, filed May 28, 2013, now U.S. Pat. No. 9,047,189, which is hereby incorporated by reference in its entirety.

BACKGROUND

Maintaining data reliability for systems that store and manage data generally requires a variety of different techniques to prevent and detect errors in stored data. Typically, multiple or redundant copies of data are stored in order to ensure that at least one error-free copy of data is maintained. Equally important to maintaining data reliability is detecting whether or not stored data contains errors. Data corruption, for example, may occur over time in one or more location in data store. Detecting data errors like data corruption is often performed by one or more mechanisms located on a storage device itself, which are hidden from clients, applications, and other users of data. Alternatively, clients, applications, or other users may perform their own detection operations for stored data. However, these types of techniques often prove cumbersome when dealing with varying structures or schemes for data storage, such as log-structured data storage.

DETAILED DESCRIPTION

Figure 1:
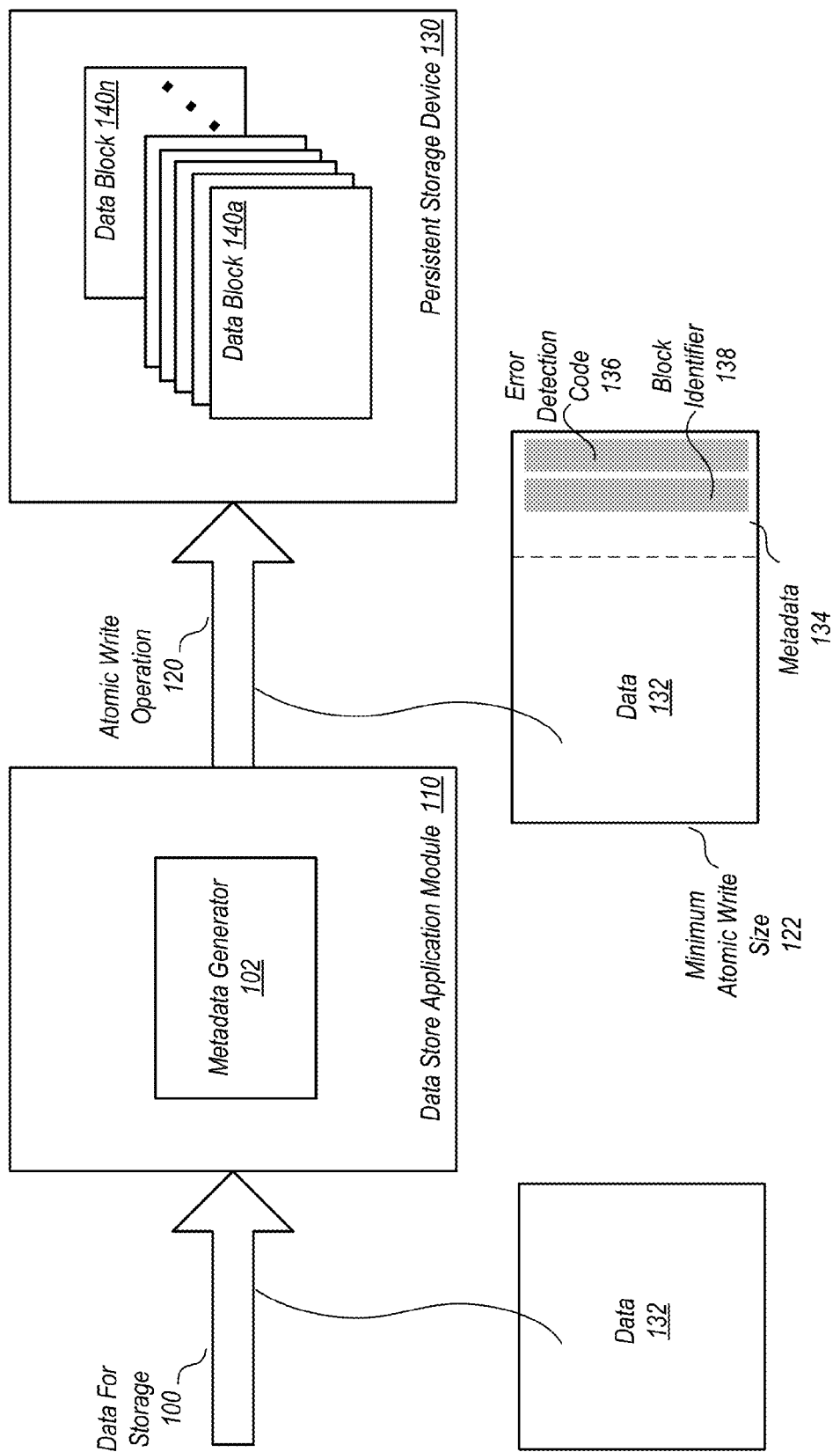
FIG. 1 is a block diagram illustrating generating self-describing data blocks of a minimum atomic write size for a data store, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various embodiments of self-describing data blocks of a minimum atomic write size are disclosed. A data store, such as data storage for a database or a storage node of a distributed storage system may, in some embodiments, implement at least one persistent storage device. The at least one persistent storage device may have a minimum atomic write size. In various embodiments, data may be received for storage in a data block of a plurality of data blocks on the at least one persistent storage device. Metadata may be generated for the data, which may include an error detection code that is generated for the data and the metadata together. The data and the metadata may then be sent to the persistent storage device to store together the data and the metadata according to the minimum atomic write size in the data block. The error detection code may be applicable to detect errors when accessing the data block. In various embodiments, the error detection code may also be applicable to identify whether a data block is storing data for a currently assigned or previously assigned purpose. In at least some embodiments, a block identifier may be generated and included in the metadata for the data block according to a monotonically increasing scheme. The block identifier of data blocks may be used to determine the end of a log for data blocks on the persistent storage device implementing the log. Data blocks may, in some embodiments, be assigned to a particular zone of a plurality of zones on the at least one persistent storage device. Data blocks may be reassigned from one zone to another without reformatting the data block.

The specification first describes an example of self-describing data blocks of a minimum atomic write size for a data store. A distributed storage service, such as a distributed storage service implemented as part of various web services, may be configured to implement self-describing data blocks of a minimum atomic write size using a variety of different techniques. Included in the description of the example distributed storage are various aspects of the distributed storage service, such as a storage node, as well as various other services with which a distributed storage service may interact, such as a database service. The specification then describes flowcharts of various embodiments of methods for self-describing data blocks of a minimum atomic write size for a data store. Then, the specification describes an example system that may implement the disclosed techniques. Throughout the specification a variety of different examples may be provided.

A data store that stores and manages data may generally be expected to persist data received for storage at the data store reliably. As part of providing reliability, various error detection techniques may be used to determine whether a given portion of the data stored in the data store, such as a data block or set of data blocks includes any error, such as might be caused by bit rot or some other form of data corruption. It is common for many types of data stores and storage systems to generate one or more error detection codes that may be applicable to determine whether given data is erroneous. These error detection codes, such as a cyclic redundancy check (CRC), however are typically stored separate from the data for which they describe, such that when data is accessed, the error detection code may also be accessed to determine whether the accessed data is reliable. By storing this error detection code separately, typical systems may perform storage or write operations to two or more separate locations. If a system failure or other problem causes an interruption of these write operations where an error detection code or data is written without the corresponding information, then any subsequent action that wishes to determine if the data contains error will detect erroneous data, whether or not the data itself is actually erroneous. For instance, if the data is stored, but an entry for the error detection code for the data is not written to, when determining the reliability of the stored data the random value already present in the entry for the error detection code will likely falsely indicate that the stored data contains an error. In this example, an incomplete or torn write is indistinguishable from error in the data, although the incomplete write contains reliable data. With many different data storage techniques dependent on determining accurately determining whether data is reliable, false indications of error may compound to decrease a data store's performance over time.

FIG. 1 illustrates self-describing data blocks of a minimum atomic write size for a data store, according to some embodiments. Various data 100 may be received at data store 110 for storage. This data 100 may be stored for a variety of different reasons, such as storing data for a database or storing files in a file system. Data 100 may be of various sizes and types. For example, data may be compressed versions of other data or any other form, structure, or logical arrangement of data to be stored. In some embodiments, variously-sized data may be a portion of a data object, such as a data object that is not exactly divisible into a minimum atomic write size of a data store. For example, if a data object is 16 kilobytes and a minimum write size of a data store is a 4 kilobytes, then the data object is exactly divisible into 4 kilobytes (i.e. with no remainder). However, if a data object is 14 kilobytes, then the data object is not exactly divisible into 4 kilobytes (as there is a remainder of 2 kilobytes). This 14 kilobyte data object may then be considered variably-sized. Data 100 may or may not be variably-sized data objects. However, in at least some embodiments, data 100 that is not variably-sized may be modified in such a way that they become variably-sized. For instance the 16 kilobyte data object from the example above may be compressed into a 7 kilobyte size data object, which may be variably-sized. Data for storage 100 may also be received as part of providing storage operations or some other data store service. For instance, in some embodiments data for storage 100 may be data for one or more log records of a log that records transactions with respect to data stored at a storage system.

A data store application module 110 may receive these various data objects for storage. A data store application module 110 may be any type of one or more application programs configured to receive data for storage, such as storage node manager 332 described in further detail below with regard to FIG. 3. In at least some embodiments, data store application module 110 may implement a metadata generator 102, which may be any type of component, sub-system or module, comprising hardware, software, or a combination of both, which may generate metadata for data that is received for storage at a data store. Metadata generator may be configured to perform a variety of different techniques. For instance, in at least some embodiments, metadata generator 102 may be configured to generate an error detection code. This error detection code, such as a CRC, may be applicable to determine to detect errors. In at least some embodiments, the error detection code is generated for the data and the metadata together, applicable to detect errors in both. Various other types of metadata may also be generated, such as a block identifier which identifies a location of a data block in which the data is to be stored in a logical sequence of data blocks, and/or a zone identifier, which identifies a particular zone of a persistent storage device to which a data block may be assigned.

Metadata generated for data may, in some embodiments be applicable to make various determinations about the data block in which it is stored. For instance, in some embodiments, a data block that is known not to be corrupt (e.g., via a CRC) may then be examined for other indicators, such as a block identifier, or some other identifier that indicates a current purpose of the data block (e.g., a zone identifier). Thus if, for example, a data block is accessed for a specific purpose, a determination may be made as to whether the data stored in the data block may also be for that same purpose. Consider the scenario where a data block was previously used to store client data. The data block may then be reassigned to a different purpose, such as storing data for a log record as part of a log for an application. If the reassignment is made (e.g., in an allocation map) prior to new data being written in the data block and the data block is subsequently accessed, it may be determined that the data block has not yet been written for is newly assigned purpose, and is not corrupt.

An atomic write operation 120 may then be performed, sending the data and the metadata to persistent storage device 130 to be stored together according to the minimum atomic write size in a data block of persistent storage device 130, such as data block 140a. Persistent storage device 130 may be one of many different types of persistent storage device used to implement a data store, such as a mechanical storage device (e.g., hard disk drive), a non-mechanical storage device (e.g., solid state drive), or configuration of multiple storage devices (e.g., redundant array of disks (RAID)), configured to persist data received for storage at data store application module 110. When writing data to storage in data store 110, data store 110 may be configured to perform a write operation in a minimum atomic write size. This minimum atomic write size may be the largest portion of data that may be written by the persistent storage device atomically, such that the write either occurs or does not occur. Torn or incomplete writes therefore may not occur when performing an atomic write operation. Persistent storage device 130 may be configured to store data in multiple data blocks, such as data blocks 140a through 140n, that are equivalent to the minimum atomic write size. For instance, if the data store may atomically write 4 kilobytes of data at once, then the data blocks in which data may be stored may also be 4 kilobytes in size. In some embodiments, all or nearly all data blocks of persistent storage device may be configured to store data for an application and metadata together in the same data block, such as illustrated by data 132 and metadata 134.

Various techniques or embodiments of self-describing data blocks of a minimum atomic write size for a data store may be implemented, such as for data stored on data blocks 140a through 140n on persistent storage device 130. For instance, data 132 is an example of one of the various types of data for storage 100 that may be received for storage at data store application 110, such as a variably-sized data object (or portion of the data object) received for storage from a user, client, or other system, or other data for implementing a data store, such as data for log or other types of records, pages, transactions, services, etc. . . Metadata generator 102 may generate metadata 134 for data 132. In this example, an error detection code 136 may be generated as well as a block identifier 138. The metadata 134 when combined with data 132 may, in some embodiments be of (or not exceed) minimum atomic write size 122. As noted above, data blocks 140a through 140n on persistent storage device 130 may be equivalent to atomic write size 122, and therefore, be written to atomically. Data 132 and metadata 134 may then be sent to persistent storage device 130 to be stored together in a data block, such as data block 140a. When accessing the data block storing data 132, in some embodiments, error detection code 136 may be applicable to detect errors in data 132 or metadata 134.

Please note that the examples and discussion given above with regard to be FIG. 1 is not intended to be limiting as to other arrangements, methods, or techniques to implement self-describing data blocks of a minimum atomic write size. FIG. 1 may describe logical arraignments of data in a data store and may not describe the physical storage of data in a data store or other persistent data storage device.

As discussed above, many different types of systems that implement a data store may implement the various embodiments of self-describing data blocks of a minimum atomic write size. In the following discussion, examples are given of various devices and or systems that may implement different embodiments. For example, in some embodiments, a web service may enable clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

These systems may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer and distributed across multiple nodes and storage devices. For example, in some embodiments, rather than the database engine applying changes to database tables (or data pages thereof) and then sending the modified data pages to the storage layer, the application of changes to the stored database tables (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum. Similarly, for a read request directed to a particular segment, the client-side driver may route the read request to all of the nodes on which the segment is stored (e.g., asynchronously and in parallel, at substantially the same time). As soon as the client-side driver receives the requested data from a read quorum of the storage nodes in the protection group, it may return the requested data to the database tier (e.g., to the database engine head node).

In some embodiments, the database tier may support the use of synchronous or asynchronous read replicas in the system, e.g., read-only copies of data on different nodes of the database tier to which read requests can be routed. In such embodiments, if the database engine head node for a given database table receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, a client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database tables, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. For example, in some embodiments, in response to a request to make a change to a database table, the client-side driver may be configured to determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

Figure 2:
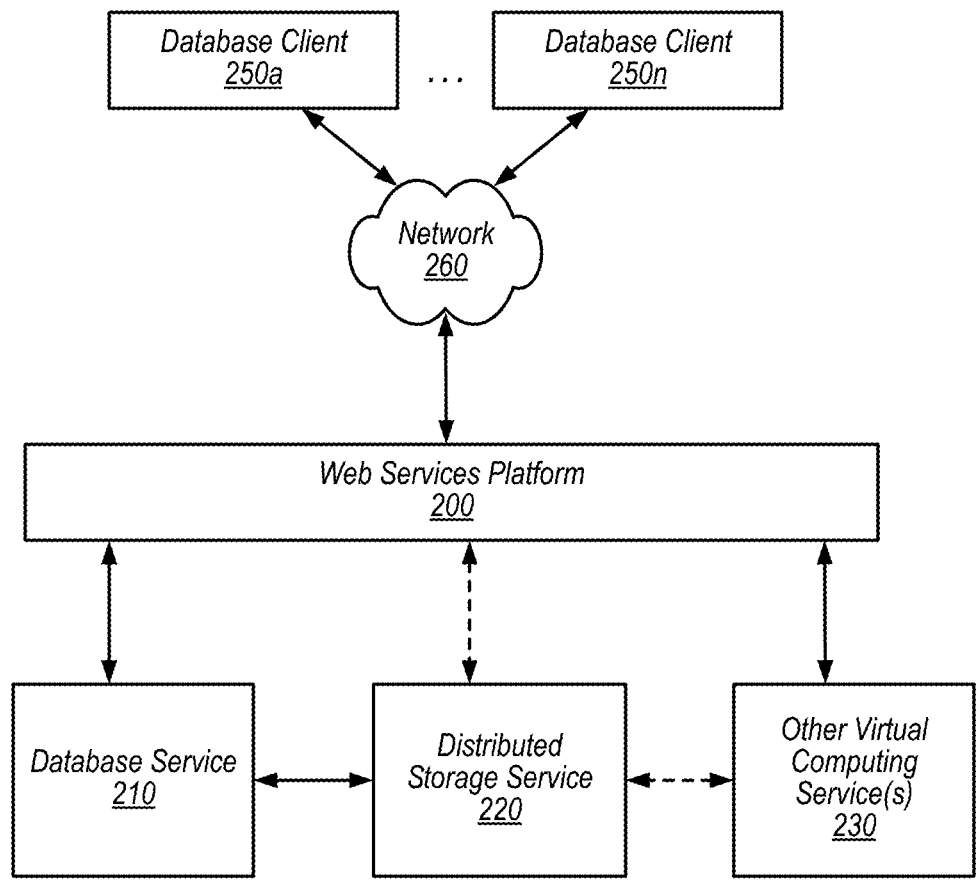
FIG. 2 is a block diagram illustrating an example operating environment for a distributed storage service, according to some embodiments.

An example of a service system architecture that may be configured to implement a web services-based database service is illustrated in FIG. 2. In the illustrated embodiment, a number of clients (shown as database clients 250a-250n) may be configured to interact with a web services platform 200 via a network 260. Web services platform 200 may be configured to interface with one or more instances of a database service 210, a distributed database-optimized storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit web services requests to web services platform 200 via network 260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing web services requests without necessarily implementing full browser support for all types of web-based data. That is, client 250 may be an application configured to interact directly with web services platform 200. In some embodiments, client 250 may be configured to generate web services requests according to a Representational State Transfer (REST)-style web services architecture, a document- or message-based web services architecture, or another suitable web services architecture.

In some embodiments, a client 250 (e.g., a database service client) may be configured to provide access to web services-based storage of database tables to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. The details of interfacing to Web services platform 200 may be coordinated by client 250 and the operating system or file system on behalf of applications executing within the operating system environment.

Clients 250 may convey web services requests (e.g., a snapshot request, parameters of a snapshot request, read request, restore a snapshot, etc.) to and receive responses from web services platform 200 via network 260. In various embodiments, network 260 may encompass any suitable combination of networking hardware and protocols necessary to establish web-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and web services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and web services platform 200. It is noted that in some embodiments, clients 250 may communicate with web services platform 200 using a private network rather than the public Internet. For example, clients 250 may be provisioned within the same enterprise as a database service system (e.g., a system that implements database service 210 and/or distributed database-optimized storage service 220). In such a case, clients 250 may communicate with platform 200 entirely through a private network 260 (e.g., a LAN or WAN that may use Internet-based communication protocols but which is not publicly accessible).

Generally speaking, web services platform 200 may be configured to implement one or more service endpoints configured to receive and process web services requests, such as requests to access data pages (or records thereof). Data objects, such as data objects 100 discussed above with regard to FIG. 1 may also be received, created, modified, or manipulated as part of processing these web-services requests. For example, web services platform 200 may include hardware and/or software configured to implement a particular endpoint, such that an HTTP-based web services request directed to that endpoint is properly received and processed. In one embodiment, web services platform 200 may be implemented as a server system configured to receive web services requests from clients 250 and to forward them to components of a system that implements database service 210, distributed database-optimized storage service 220 and/or another virtual computing service 230 for processing. In other embodiments, web services platform 200 may be configured as a number of distinct systems (e.g., in a cluster topology) implementing load balancing and other request management features configured to dynamically manage large-scale web services request processing loads. In various embodiments, web services platform 200 may be configured to support REST-style or document-based (e.g., SOAP-based) types of web services requests.

In addition to functioning as an addressable endpoint for clients' web services requests, in some embodiments, web services platform 200 may implement various client management features. For example, platform 200 may coordinate the metering and accounting of client usage of web services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed database-optimized storage service 220 and/or another virtual computing service 230 (or the underlying systems that implement those services).

In some embodiments, platform 200 may also implement user authentication and access control procedures. For example, for a given web services request to access a particular database table, platform 200 may be configured to ascertain whether the client 250 associated with the request is authorized to access the particular database table. Platform 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, platform 200 may reject the corresponding web services request, for example by returning a response to the requesting client 250 indicating an error condition. Various access control policies may be stored as records or lists of access control information by database service 210, distributed database-optimized storage service 220 and/or other virtual computing services 230.

It is noted that while web services platform 200 may represent the primary interface through which clients 250 may access the features of a database system that implements database service 210, it need not represent the sole interface to such features. For example, an alternate application programming interface (API) that may be distinct from a web services interface may be used to allow clients internal to the enterprise providing the database system to bypass web services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed database-optimized storage service 220 over a local or private network, shown as the solid line between distributed database-optimized storage service 220 and database service 210 (e.g., through an API directly between the systems that implement these services). In such embodiments, the use of distributed storage service 220 in storing database tables on behalf of clients 250 may be transparent to those clients. In other embodiments, distributed database-optimized storage service 220 may be exposed to clients 250 through web services platform 200 to provide storage of database tables or other information for applications other than those that rely on database service 210 for database management. This is illustrated in FIG. 2 by the dashed line between web services platform 200 and distributed database-optimized storage service 220. In such embodiments, clients of the distributed database-optimized storage service 220 may access distributed database-optimized storage service 220 via network 260 (e.g., over the Internet). In some embodiments, a virtual computing service 230 may be configured to receive storage services from distributed database-optimized storage service 220 (e.g., through an API directly between the virtual computing service 230 and distributed database-optimized storage service 220) to store objects used in performing computing services 230 on behalf of a client 250. This is illustrated in FIG. 2 by the dashed line between virtual computing service 230 and distributed database-optimized storage service 220. In some cases, the accounting and/or credentialing services of platform 200 may be unnecessary for internal clients such as administrative clients or between service components within the same enterprise.

Note that in various embodiments, different storage policies may be implemented by database service 210 and/or distributed database-optimized storage service 220. Examples of such storage policies may include a durability policy (e.g., a policy indicating the number of instances of a database table (or data page thereof) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, distributed database-optimized storage service 220 may implement a higher durability for redo log records than for data pages.

In some embodiments, the distributed storage systems described herein may organize data in various logical volumes, segments, pages, or data blocks for storage on one or more storage nodes. For example, in some embodiments storing data for a database table, each database table is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) (e.g., a log of redo log records) for each data page that it stores. In at least some embodiments, data blocks, such as data blocks 140 described above with regard to FIG. 1 may organized into these various collections of data pages, change or some other organization or structure. Data blocks may be equivalent to minimum atomic write size of the storage device implemented by the distributed storage service 220. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). This coalesce operation may create a new data object that is variably-sized. In some embodiments, data pages and/or change logs may be mirrored across multiple storage nodes, according to a variable configuration (which may be specified by the client on whose behalf the database table is being maintained in the database system). For example, in different embodiments, one, two, or three copies of the data or change logs may be stored in each of one, two, or three different availability zones or regions, according to a default configuration, an application-specific durability preference, or a client-specified durability preference.

Figure 3:
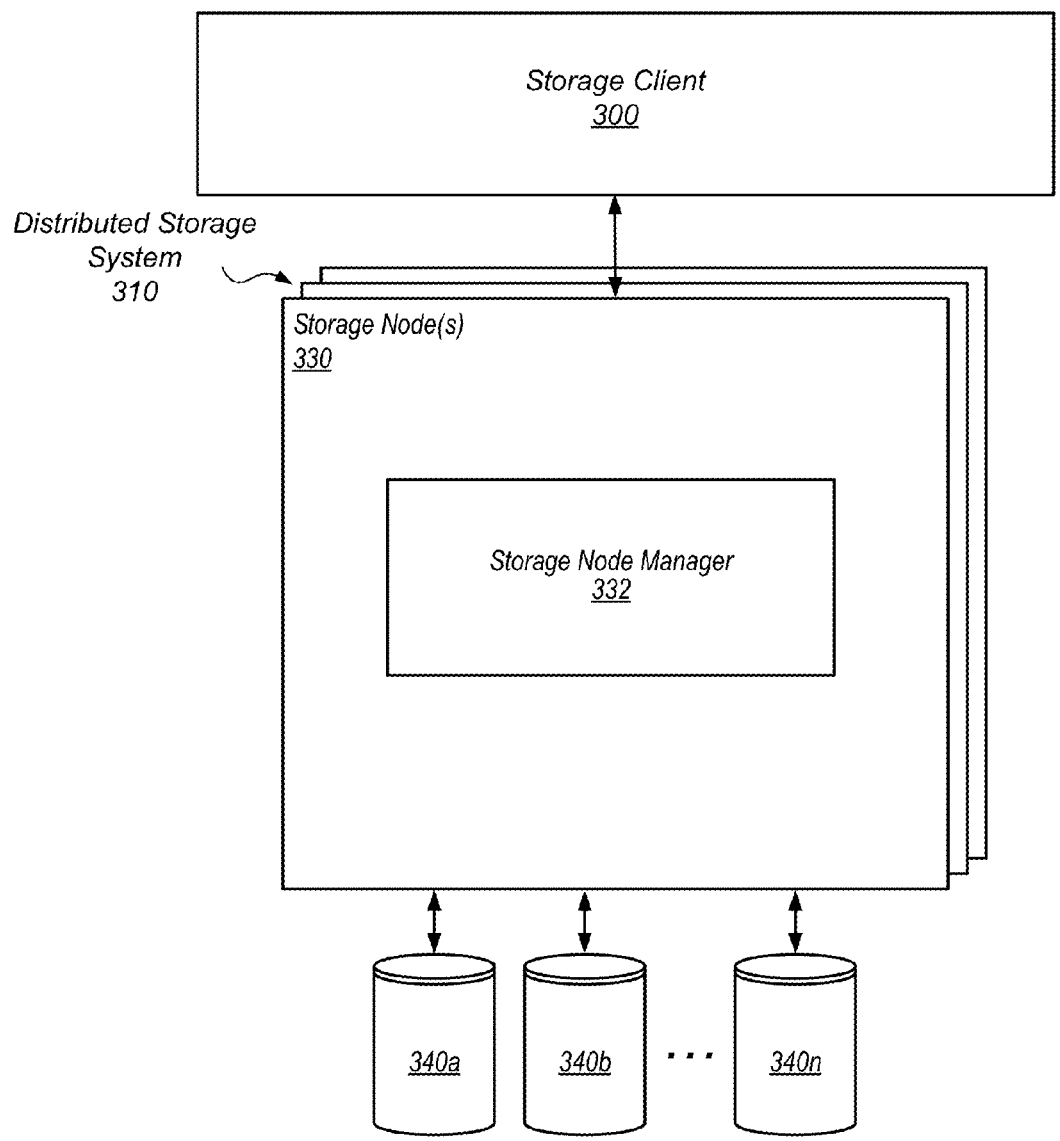
FIG. 3 is a block diagram illustrating a distributed storage system, according to some embodiments.

One embodiment of a distributed storage system is illustrated by the block diagram in FIG. 3. In this example, storage client 300 may be a database system or other device, program, system, or application that may provide data to distributed storage system 310 for storage. Storage client 300 may communicate with one or more storage nodes 330 of distributed storage system 310 over a network, such as network 260 in FIG. 2, or other method/form of external or internal communication. In this example, distributed storage system 310 includes multiple storage nodes, each of which may include storage for a storage client. For example, if storage client is a database service similar to database service 210 described above with regard to FIG. 2, data pages and redo logs for segments may be stored on one or more storage nodes 330. Storage nodes may implement a variety of different hardware and/or software components to perform various management functions for data stored on the storage node.

In at least some embodiments, storage node 330 may include a storage node manager 332 which may perform the various techniques and methods to implement self-describing data blocks of minimum atomic write size for a data store. Data received for storage at storage node 330 may be one of the variously described log records, data objects (such as a variably-sized data object). In some embodiments, storage node manager 332 may implement various techniques described below with regard to FIG. 8, which divide received data up into equally-sized portions (and possibly a remainder). Storage node manager 332 may process, modify, compress, alter or otherwise manipulate received data for storage. In at least some embodiments, storage node manager may combine data, such as one or more log records. Storage node manager 332, similar to application module 110 described above in FIG. 1, may generate metadata for the data. The generated metadata may include a variety of different indicators that describe various characteristics or the type of data stored. Similarly, the metadata may describe the one or more purposes, such as different logical structures, zones, pages, etc. to which a data block may be assigned. In at least some embodiments, an error detection code such as CRC, may be generated. The CRC may provide error detection capability for the data to be stored as well as other metadata to be stored with the data. Storage node manager may also be configured to determine upon access of a data block whether a data block stores data for a currently assigned purpose or a previously assigned purpose. For instance, if a zone indicator indicates that a data block stores data for a log zone, and an access request for log records includes reading the data block, then the zone indicator may identify that the data block is storing data for log records as part of the log zone and may be used to service the access request. Alternatively, if the data block is accessed as part of an access request for zone log records (e.g., as might be determined by block allocation mapping information) and the zone indicator indicates that the data block is assigned to a data zone, then it may be determined that the data block stores data for the previous purpose (e.g., data zone) and is not applicable to the current access request for log records as the data is old and is to be ignored when servicing the access request.

Block identifiers may be generated as part of the metadata, in some embodiments. These block identifiers may identify the location of a data block within a logical sequence of data blocks in a persistent storage device. For instance, a group of data blocks may together make up a page. A block identifier may provide the relative location of the data block within the other data blocks that make up that page. The block identifier may be specific to a particular persistent storage device, such that another persistent storage device, (e.g., 340*a* vs. 340*b*) may use the same value as it is specific to that particular device. Similarly, a block identifier may be generated according to a larger scheme, such as a monotonically increasing scheme. In at least some embodiments, a storage operation or write to a data block may have a monotonically increased identifier, such that after a system failure or other restart of storage node 330, the identifier will continue to increment from the last used identifier, instead of restarting at the beginning A sufficiently large allocation of metadata space may be reserved for the block identifier, that in some embodiments, that the identifier may increase monotonically indefinitely. For example, if an 8 byte space is reserved, a billion writes producing different increasing identifiers can be received per second for 500 years without exhausting amount of unique identifiers.

Storage node manager 332 may send the data and metadata together to a persistent storage device, such as 340*a*, to write to a data block according to a minimum atomic write size. For example, if the minimum atomic write size for persistent storage device 340*a* is 4 kilobytes, then, storage node manager will send data and metadata together totaling 4 kilobytes to persistent storage device 340*a* to write atomically into a single data block.

Storage node manager may also perform various operations to access data blocks, which may require detection of error within a data block. For instance, as described below with regard to FIGS. 6A and 6B, the end of a log (as represented by a group, or sequence of data blocks on a persistent storage device) may be detected, by examining block identifiers of those data blocks which are determined not to contain erroneous data (e.g., corrupted data whether through transmission or deterioration at the data block). Similarly, as described below with regard to FIG. 7, data blocks may be easily reassigned to different zones within a persistent storage device (e.g., log zone and data zone in FIG. 4) without the worry that a false indication of corruption may disrupt a recovery or other operation when using reassigned data blocks. Scenarios similar to the techniques discussed with regard to FIG. 8 may also arise, where a storage node manager may divided a data object into portions in order to include the metadata before storing together the portion of data and the metadata atomically. Please note, that the above examples are not intended to be limiting as to the various other methods, functions, and/or operations that storage node manager or some other component on storage node 330 (or distributed storage system 310) may perform.

In various embodiments, each storage node may also have multiple attached persistent data storage devices, 340*a*-340*n*, (e.g., SSDs) on which data blocks may be stored on behalf of storage clients (e.g., users, client applications, and/or database service subscribers). Note that the label "SSD" may or may not refer to a solid-state drive, but may more generally refer to a local block storage volume, regardless of its underlying hardware. Such devices may be implemented by various storage device technologies, such as mechanical storage devices (e.g., hard disk drives) or non-mechanical storage devices (e.g., flash-based storage devices). In some embodiments, a persistent data storage device, 340*a*-340*n*, may have a minimum write size (also sometimes referred to as a sector or sector size). This minimum write size may be the unit of alignment on a persistent storage device, such that blocks storing data on the device may be equivalent to the minimum write size. As discussed above, a minimum write size on a persistent storage device that can be written atomically, that is without the risk that the write will only be partially completed. For example, the minimum write size for various solid-state drives and spinning media may be 4 KB. In some embodiments of the distributed storage systems described herein, data blocks may include metadata generated at the application level (e.g., storage node manager), such as a 64-bit (8 byte) CRC, at the beginning of the data block, regardless of the higher-level entity (e.g., data page) of which the data block is a part.

In some embodiments, each of the storage system server nodes in the distributed storage system may implement a set of processes running on the node server's operating system that manage communication with the database engine head node, e.g., to receive redo logs, send back data pages, etc. In some embodiments, all data blocks written to the distributed storage system may be backed up to long-term and/or archival storage (e.g., in a remote key-value durable backup storage system).

A variety of different allocation models may be implemented for a persistent storage device, such as persistent storage devices 340a-340n, in different embodiments. For example, in some embodiments, data blocks for a log zone and data blocks for a data zone may be allocated from a single heap of data blocks (or groups of data blocks such as pages) associated with a persistent storage device. This approach may have the advantage of leaving the relative amount of storage consumed by a particular zone of a plurality of zones, such as a log zone and data zone, to remain unspecified and to adapt automatically to usage. It may also have the advantage of allowing data blocks (or groups of data blocks such as pages) to remain unprepared until they are used, and repurposed at will without preparation. Once such allocation model is illustrated by the block diagram in FIG. 4 and described below.

Figure 4:
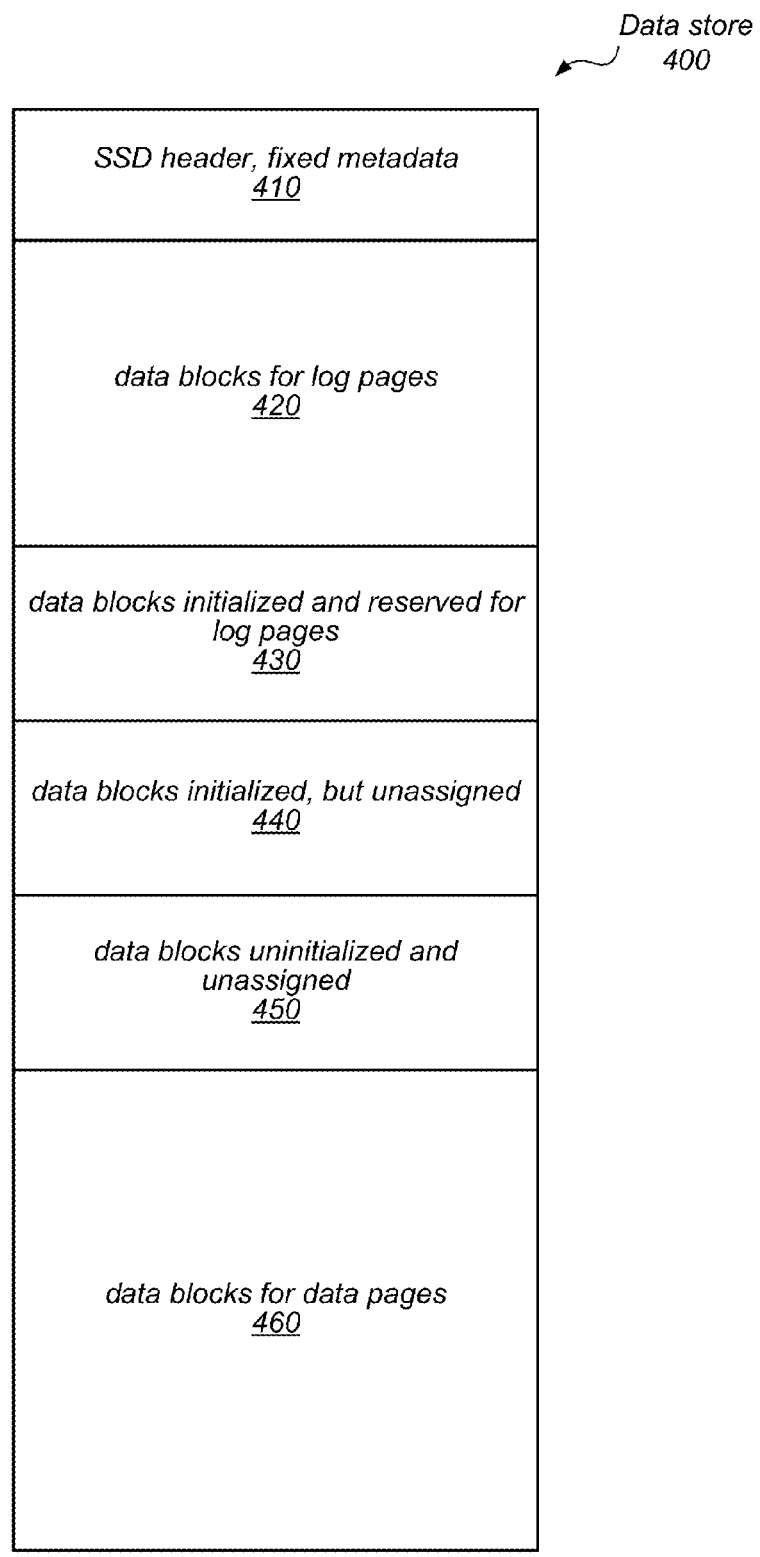
FIG. 4 is a block diagram illustrating an example data store implementing self-describing data blocks of a minimum atomic write size, according to some embodiments.

FIG. 4 is a block diagram illustrating how self-describing data blocks may be stored on a data store, such as on a given storage node (e.g., on a persistent storage device attached to the storage node) of a distributed storage system, according to some embodiments. Data store 400 may store a header and other fixed metadata in the portion of the space labeled 410. It may store a variety of different types of data used for different purposes (e.g., log records, remainders of data objects, or any other portion of data) in the data blocks for log pages 420, which includes data blogs assigned to space 420 (which in this examples is for log pages) and includes a space labeled 430 that is initialized and reserved for additional data blocks to store log data. One portion of data store 400 (shown as 440) is initialized, but unassigned, and another portion of the space (shown as 450) is uninitialized and unassigned. Finally, the portion of data store 400 labeled 460 stores fixed size-data objects.

In allocation approach illustrated in FIG. 4, data may be packed into the beginning of the flat storage space. Holes that open up due to data blocks, or groups of data blocks (e.g., pages), being freed may be reused before additional storage space farther into the address space are used. A reclamation process may be performed when a certain percentage or proportion of data blocks or groups of data blocks (e.g. pages) are freed. In some embodiments, this reclamation process of rebalancing/reclaiming variably-sized space may be performed as a background task.

In the example illustrated in FIG. 4, the storage area of data blocks for log pages includes the area between the first usable log page slot of data blocks for log pages 420 and the last reserved data block of 430. In some embodiments, this pool may safely grow up to the last data block of the initialized but unassigned portion 440 without re-initialization of new data blocks as data blocks storing data for variably-sized data objects (e.g., by persisting an update to a pointer that identifies the last reserved log page slot). In this example, beyond the last usable data block in 440, the pool of data blocks for log pages may grow up to the first used data block of data blocks for data pages 460 by persisting initialized data blocks for log pages and persistently updating a pointer for the last usable log page slot. In this example, the previously uninitialized and unassigned portion of data store 400 shown as 450 may be pressed into service to store data blocks for log pages. Similarly, the pool of data blocks for variably-sized data objects may shrunk by setting a pointer to an earlier location in the data store 400.

In the example illustrated in FIG. 4, the current area of the storage area of data blocks for data pages 460 includes the area between the last usable data block for log pages at the end of 440 and the end of data store 400. In some embodiments, the data block pool for data pages may be safely grown to the position identified by a pointer to the last reserved data block for log pages at the end of 430 by persisting an update to the pointer to the last usable data block for log pages. In this example, the previously initialized, but unassigned portion of the data store 400 shown as 440 may be pressed into service to store data blocks for data pages.

In various embodiments, garbage collection may be performed for those data blocks storing data for log pages, 420, etc. . . For example, in some embodiments the data blocks may implement as a log structure. Garbage collection may be done to reclaim space occupied by obsolete log records, e.g., log records that no longer need to be stored or persisted. For example, a log record may become obsolete when there is a subsequent record for the same data object and the version of the data object represented by the log record is not needed for retention. In some embodiments, a garbage collection process may reclaim space by merging two or more adjacent log pages (groups of data blocks storing log records) and replacing them with fewer new log pages containing all of the non-obsolete log records from the log pages that they are replacing. After the write of these new log pages is complete, the replaced log pages may be added to the free data block pool for the variably-sized data storage area. In at least some embodiments, data blocks for log pages may be further divided into two other zones, a hot log zone and a cold log zone. Each log zone may enforce different requirements on data blocks and/or log records stored within the zone. Log records in the hot log zone may, for instance be stored, out of order. However, log records in the cold log zone may be stored in order.

Figure 7:
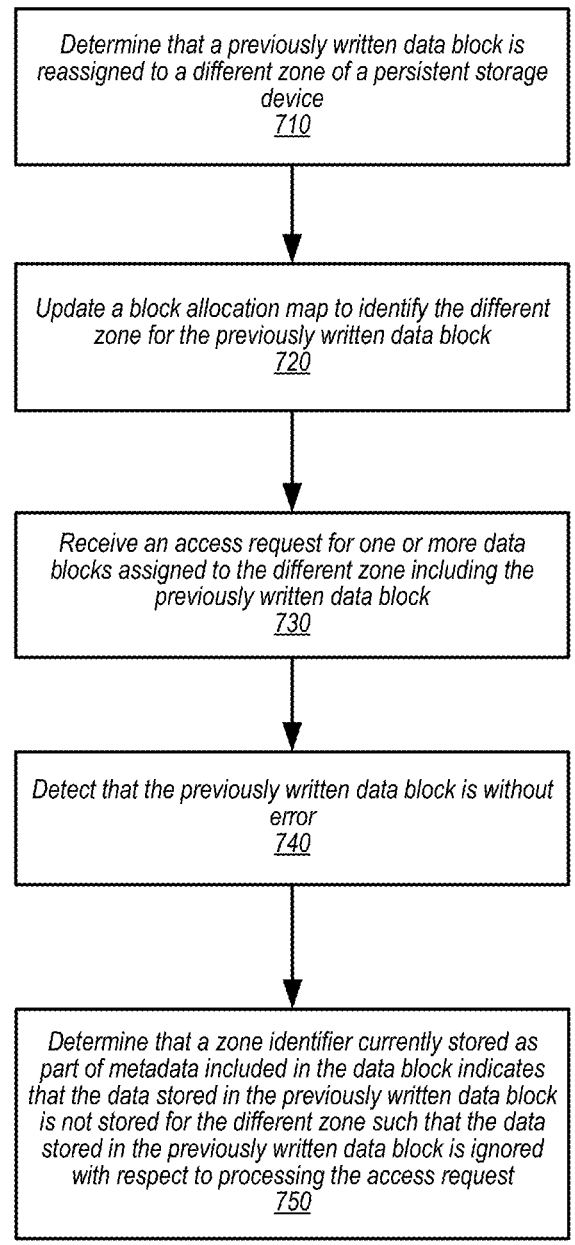
FIG. 7 is a high-level flowchart of a method to update a zone assignment for a self-describing data block of a minimum atomic write size, according to some embodiments.

FIG. 7, discussed in further detail below, provides example techniques and methods for reassigning data blocks from one purpose to another, such as one zone to another (e.g., such as moving data blocks initialized, but unassigned 440 to be part of a log page 420 or a data page 460). Zone indicators may be stored as part of the metadata generated for data stored in a data block which indicates a zone assignment. A data store 400 allocation map, such as in fixed metadata 410, or some other type of data structure/persistent storage area, that may track the assignment of zones from one zone to another.

In at least some embodiments, data blocks are formatted in a same manner regardless of the zone to which they are assigned or the data which they store. A data block for a log page, for instance, may have the same amount of space occupied for the metadata describing the data block, as a data block for a data page. Data blocks filled with zeros, or some other special pattern or indicator, may be recognized as the error detection code (or in place of the error detection code) by a storage node manager or some other system to indicate that the data block is without error, even though a technique applying the error detection code may indicate otherwise. For example, in some embodiments, data blocks may contain a CRC value of all zeros. For data blocks with CRC values of all zeros, and other data values in the data block also zero, the data block may be determined to be without error though performing the CRC technique using the data of all zeros in the data block would not necessarily produce a CRC value of all zeros.

Please note, that the above locations illustrated and discussed above may, in some embodiments, refer to logical arrangements or descriptions of data stored in the data stored. A plurality of zones or other logical arrange may be used in addition to the log and data zones illustrated. Moreover, physical arrangements and/or storage locations may differ from those shown, and as such the previous description regarding the allocation of data blocks is not intended to be limiting.

Figure 5:
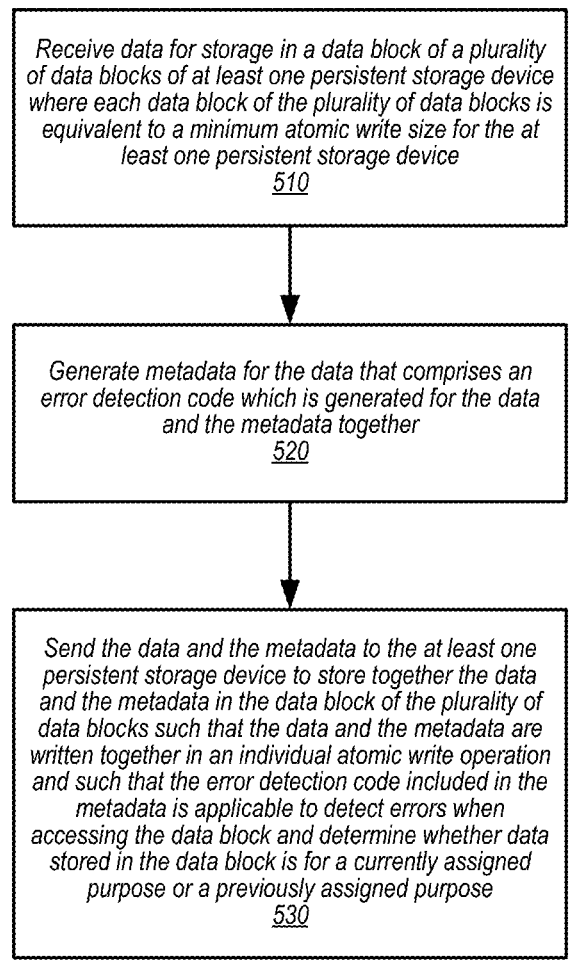
FIG. 5 is a high-level flowchart of a method to implement self-describing data blocks of a minimum atomic write size, according to some embodiments.

FIG. 5 is a high-level flowchart of a method to method to implement self-describing data blocks of a minimum atomic write size, according to some embodiments. Numerous types of systems or devices implementing data stores may apply the methods and techniques discussed below. A distributed storage service, such as discussed above with regard to FIG. 2, a storage node manager, discussed above with regard to FIG. 3, or any other type of system or data store, such as a log-structured data store, implemented by a computing system, such as computing system 1000 described below with regard to FIG. 9 may be used to perform some or all of the various elements described below.

Data for storage in a data block of a plurality of data blocks of at least one persistent storage device may be received, as indicated at 510. As noted above, data received for storage in a data block may be of many different types and/or used for different purposes. For instance, in some embodiments, data may be received for one or more log records that are used to implement a redo log, undo log, transaction table, or some other component of a log-structured database or data store. These log records may be received from another system or component separate from a storage service, such as database service 210 in FIG. 2. Data received for storage may also be part of a larger data object, such as set of user records stored for a database table, a large file, such as media file (e.g., audio recording, video, etc.).

The data blocks of the at least one persistent storage device may, in various embodiments, be equivalent in size to a minimum atomic write size of the persistent storage device. Thus, for instance, if the minimum atomic write size of the at least one persistent storage device is 4 kilobytes, then the size of data blocks on the at least one persistent storage device may be 4 kilobytes.

As indicated at 520, metadata may be generated for the data, in various embodiments. As noted above in FIGS. 1 and 3, metadata generally may include any indicators, identifiers, or other information that describes various characteristics of the data, such as type, or relationships of the metadata to other data, data blocks, or to the data store. Metadata may include an error detection code. An error detection code may be any type of value or indicator which applicable to detect error for the data for which is generated. Numerous types of error detection codes may be implemented, such as cyclic redundancy checks (CRC), parity bits, repeating codes, checksums, cryptographic hash codes, etc. . . The previously list is not intended to be limiting as to other types of error detection codes which may be generated. The error detection code may, in some embodiments, be generated for the data and the metadata together. Thus, if a block identifier, zone indicator, and/or other metadata are included in the metadata, the error detection code may also detect errors within those values as well.

Metadata may also include a block identifier. A block identifier, may be generated which identifies a location of a data block in a logical sequence of data blocks. This block identifier may, for instance, provide the location of a data block within a group of data blocks that make up a page, volume, segment or other grouping. More than one block identifier may be included in some embodiments. A monotonically increasing scheme may be used to generate block identifiers that are unique. As noted above, in some embodiments, reserved space for a block identifier may be sufficiently large such that the number of unique identifiers may not be feasibly exhausted for the life of the persistent storage device.

Metadata may also include an indication of a data block's currently assigned purpose, such as a zone indicator, which may indicate a particular zone to which the data block that may be used to store the data is assigned. Various types of purposes or zones exists, such as unassigned, hot log record zone, cold log record zone, data zone, and/or any other type of area or grouping of data blocks.

Data and the metadata generated for the data may be sent to the at least one persistent storage device to store together the data and the metadata, as indicated at 530. The persistent storage device may, in some embodiments, write together the data and the metadata in an individual atomic write operation to the same data block. In at least some embodiments, the size of the data and the metadata together is less than or equal to the minimum atomic write size of the data block. An atomic write operation is performed such that the write operation is performed, or is not performed (such as in the event of a device failure). Metadata stored in the data block may describe various states about the data block. For instance, in some embodiments, an error detection code may be applicable to detect whether a data block contains errors. Similarly, in some embodiments, an error free data block may then be trusted to self-describe other properties, such as the purpose for which the data block stores data. These various purposes may be identified and useful for a variety of different techniques, as discussed in further detail below with regard to FIGS. 6-8. In some embodiments, a self-describing data block storing metadata together with the data in the data block may indicate whether the data block is corrupt, whether the data is old (an example of a purpose that is not current), or useful (data is stored for the current purpose of the data block).

The error detection code stored as part of the metadata may be applicable to detect errors in the data or metadata when accessing the data block without reference to other data blocks of the persistent storage device. For instance, a given data block may supply its on CRC that is may be used to detect errors on the data block without accessing other information of the data block stored on another data block of the persistent storage device. In at least some embodiments, a scrubbing process, or error detection operation may be performed. This operation may be performed periodically and/or as part of a background process, when less resources are needed to process access requests. The workload of various systems, nodes, or devices implementing the scrubbing process may also be used to determine when, where, or how the scrubbing operation is performed. The evaluation operation may evaluate all or some of the persistent storage device. In some embodiments, some zones to which data blocks are assigned may be evaluated more frequently, or with higher priority. For instance, data blocks assigned to a data zone may be evaluated more frequently than data blocks assigned to a log zone (which may have other operations performed that also provide error detection, if not explicitly). However, in at least some embodiments, data blocks assigned to different data zones may have the same error detection operation performed without regard to the particular data zone to which the data block is assigned. Log data blocks, for instance, may have the same error detection process performed as data blocks for the data zone. The error detection operation itself may be performed consistent with the error detection code stored in the data block. Accordingly, if a data block uses a certain algorithm to generate a 64 byte CRC, then the same algorithm may be applied as part of the error detection operation to compare the results with the stored CRC. As various error detection techniques are well-known to those of ordinary skill in the art, the previous example is not intended to be limiting as to the other ways an error detection code may be applied to determine whether error exists in a data block.

For those data blocks identified as erroneous, such as by an error detection operation discussed above, a recovery operation may be performed, in some embodiments. A recovery operation may identify the scope of the identified erroneous data block. For instance, the data block may be a part of page, zone, segment, volume, etc. Based on the scope of the identified erroneous data block, a redundant copy of data may be retrieved from another persistent storage device, system, or node, which also stores the same data. In some embodiments, the amount of data retrieved may be relative to the scope of the erroneous data block. Just a redundant data for the data block may be retrieved, or the amount may be increased to replace the page, zone, segment, or volume of data including the erroneous data block. In at least some embodiments, the recovery operation performed for corrupt data blocks of a particular group or collection may be specific to that group or collection. For example, if the corrupt data blocks are assigned to a log zone, then the recovery operation may be specific to recovering data for the log zone, while a different recovery procedure may be specific to recovering data blocks assigned to the data zone.

The various techniques described above with regard to FIG. 5 may be performed in various orderings, repeatedly, serially, or in parallel, for multiple different data received. In some embodiments, the same received data may have metadata generated, as indicated at 520, for multiple different persistent storage devices upon which the data may then be sent, as indicated at 530. Thus if, for example, data is stored redundantly on different persistent storage devices to be persisted more reliably, some metadata, such as the error detection code may be the same, while some metadata, such as the block identifier may be different (as it may be particular to the specific persistent storage device upon which the data is stored).

Figure 6A:
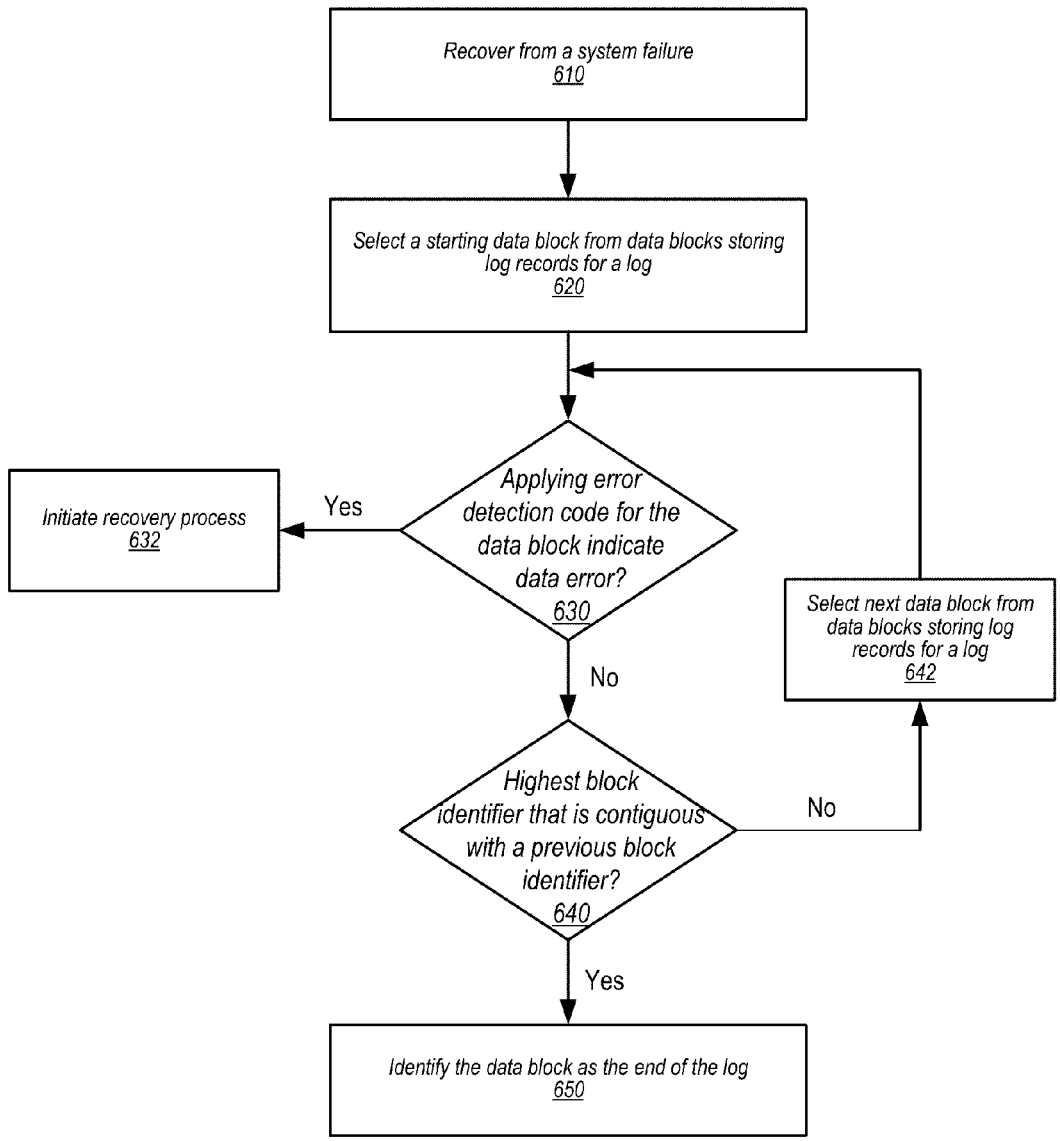
FIG. 6A is a high-level flowchart of a method to detect an end of log comprised of self-describing data blocks of a minimum atomic write size, according to some embodiments.

In at least some embodiments, multiple data and metadata may be sent, as indicated at 530 for multiple data blocks at a persistent storage device. In at least some embodiments, a persistent storage device may not guarantee that storage operations/write operations are completed (or performed) in the order in which they are received. Thus, in at least some embodiments, a system failure or other event may cause some later storage operations to be completed while other storage operations that were not yet performed when the system failure occurred, were not. In some scenarios, the ability to determine whether a data block contains error prevents inefficient or invalid performance of various data store operations. A log structure data store, for instance, may store log records on data blocks for a log, such as illustrated in FIG. 4. In the event of a system failure, the end of the log may need to be determined in order to continue writing to the log. FIG. 6A is a high-level flowchart of a method to detect an end of log comprised of self-describing data blocks of a minimum atomic write size, according to some embodiments.

Figure 6B:
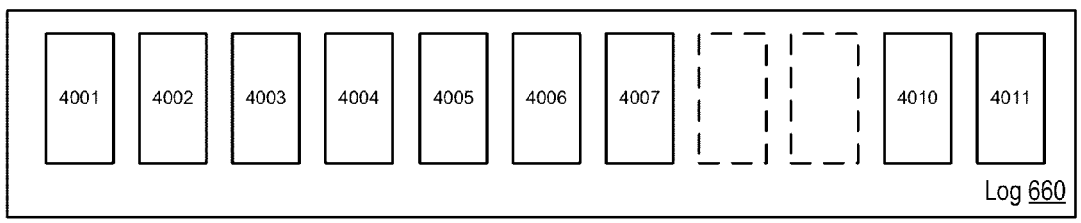
FIG. 6B is a block diagram illustrating an example log structure of self-describing data blocks of a minimum atomic write size, according to some embodiments.

FIG. 6B, for instance, is a block diagram illustrating an example log structure of self-describing data blocks of a minimum atomic write size, according to some embodiments. Consider that in the data blocks for log 660, monotonically increasing block identifiers, 4001-4011, are generated and included with the metadata stored for those data blocks. The block identifiers represent the sequence in which data for the log, such as log records are written to the log. The system failure may have interrupted the persistent storage device such that the storage operations to write to data blocks that would have stored block identifiers 4008 and 4009 were not completed (as illustrated by the data blocks outlined in the dotted line). Therefore, the only log records which may be considered persisted are those whose dependency on a prior log record is preserved. In the illustrated example, blocks 4001-4007. Log records stored on data blocks 4010 and 4011 may depend on log records that were not stored.

As indicated at 610, a log-structured data store or other storage system, may recover from a system failure. As a result of the system failure, various write operations may not have been completed, as illustrated in FIG. 6B. A starting data block in the sequence of data blocks for the log may be selected, as indicated at 620. In at least some embodiments, various checkpoints may identify those log records which may be excluded from determining the end of log. If, for instance, a checkpoint indicates that data blocks prior to data block 4003 may be excluded, then data blocks 4001 and 4002 may be excluded. Generally, a checkpoint describes the process where log records are persisted to a different storage location than the log, such as by applying the log records to data blocks storing the data that the log records describe. In at least some embodiments, checkpoint may be performed as part of a coalesce operation for an individual data page, instead of an entire database or table.

In various embodiments, the selected data block may be evaluated to determine whether the data block is erroneous, such as data corruption, indicated at 630. If an error, such as corruption, is detected, then a recovery process may be initiated, as indicated at 632. A recovery process, as described above, may retrieve a redundant copy of the log including the erroneous data upon which to reconstruct the log in the persistent storage device. However, in at least some embodiments, the data block before the erroneous data block may be subsequently identified as the end of the log. This may occur only after other various determinations are made. Consider the scenario where the redundant copies of the log also are affected by corruption, such that the portion of the log up until the erroneous data block still retains the most correct log. In such a scenario, the data block before the erroneous data block may be determined to be the end of the log.

In various embodiments, if a selected data block is determined not to be erroneous 630, then it may be determined whether the selected data block stores in the metadata the highest block identifier that is contiguous with a previous block identifier, as indicated at 640. As noted above, in some embodiments, block identifiers are generated according to a monotonically increasing scheme. Contiguous identifiers may indicate that the data block storing previous log records for the log is present. In at least some embodiments, the data block must also be valid or be determined to store data for the currently assigned purpose of the data block. For example, the data block with the highest block identifier may also indicate in metadata for the data block that the data is stored for a log record. If, for instance, the data block itself indicates that it stores data for some other previous purpose, then the block may not be valid. For example, if the block stores a zone indicator that indicates that it stores data for the data zone, then it may be determined that the block has not yet been written with log data and should not be considered when determining the end of the log. Non-contiguous identifiers, indicate that the previous log records may not be persisted. Thus, if for example, the selected data block is 4003 in FIG. 6B. A higher block identifier that is contiguous exists, data block 4004, therefore, the negative exit would be taken and the next data block from the data blocks storing records for the log would be selected, as indicated at 642. If however, the data block 4007 were evaluated at 640, then the no higher contiguous block identifier would exists, and therefore, data block 4007 would be identified as the end of the log, as indicated at 650. Please note, that FIG. 6A is provide as an example of the various methods and techniques that may be used determine the end of the log. Various other elements may be added, removed, or reordered to achieve the same determination, and as such, FIG. 6A is not to be construed as limiting.

Another scenario where distinguishing between an incomplete write and erroneous data blocks occurs based on self-describing data blocks of a minimum write size is when data blocks are reassigned to a different zone. FIG. 7 is a high-level flowchart of a method to update a zone assignment for a self-describing data block of a minimum atomic write size, according to some embodiments. In at least some embodiments, it may be determined that a previously written data block is reassigned to a different zone of a persistent storage device, as indicated at 710. This determination may be made in one of the various scenarios described above with regard to FIG. 4, such as by allocating more space to a log zone that needs to store more log records, or to a data zone space that needs to store more data. The data block may be previously written, having an error detection code included with the data in the data block.

As indicated at 720, a block allocation map, or some other type of data structure, may be updated to identify the different zone for the previously written data block. In various embodiments, updates of reassignments for a group data blocks may be performed in a single update, amortizing the costs of updating block allocation data. If a system failure or other event were to occur after the reassignment, then the previously written data block may be considered as assigned to the new data zone assignment for recovery operation purposes. Consider the scenario where a data block has been reassigned to a log zone, and the log zone is scanned to determine the end of the log. When accessing the data block, it may be determined whether the previously written data block does or does not contain an error, assuring the recovery system, that the block is not a corrupted or erroneous data block storing data for the log zone, but that the data block is assigned to the log zone and not yet written to. If, for instance, the recovery operation could not make this determination, then the data block may trigger an indication that the log is corrupt and should be truncated at that particular data block, when in fact the log is not corrupt.

Figure 8:
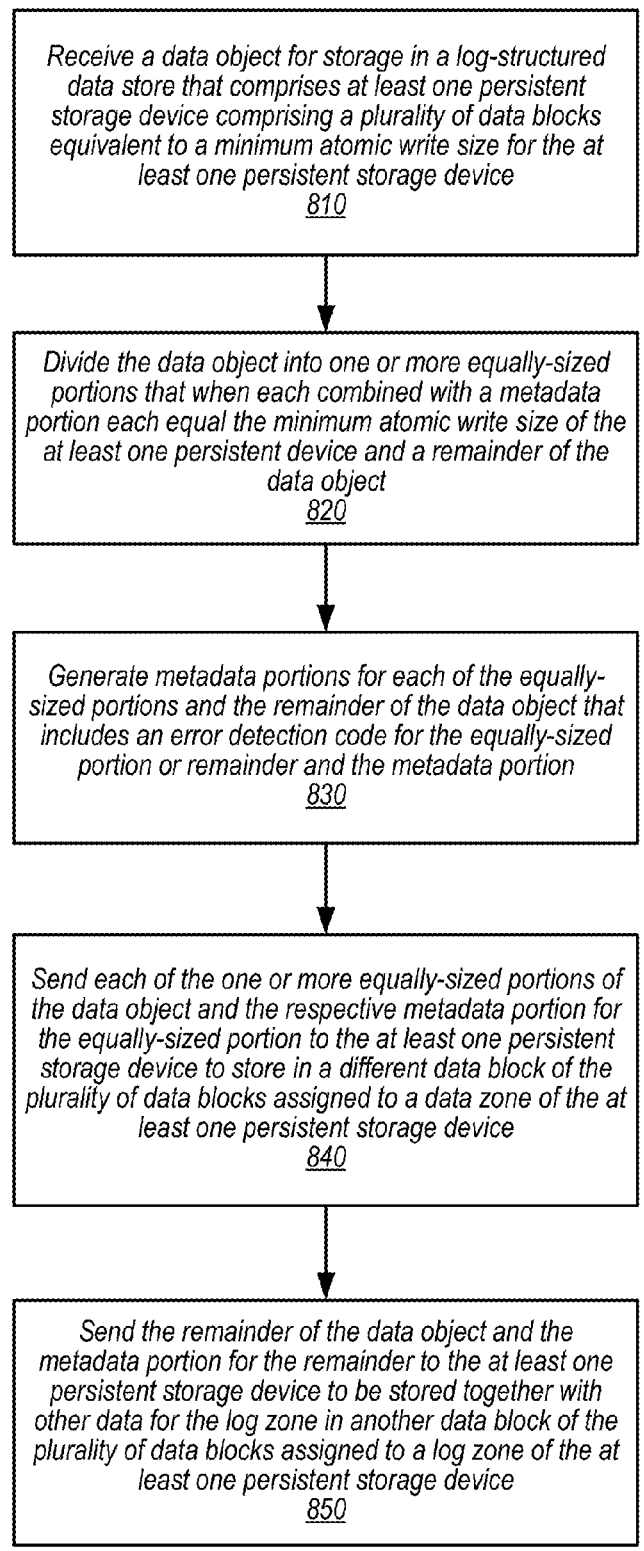
FIG. 8 is a high-level flowchart of a method to implement self-describing data blocks of a minimum atomic write size for a variably-sized data object, according to some embodiments.

Subsequently, when an access request for one or more data blocks assigned to the different zone including the previously written data block is received, as indicated at 730. Such an access request may be to read data from the data block for a variety of different purposes (e.g., read or write data) or determinations (e.g., locate the end of a log). As part of accessing the previously written data block, it may be detected that the data block is without error (e.g., based on the CRC), as indicated at 740. A determination may be made as to whether the data block stores data for a currently assigned or previous purpose. As indicated at 750, in some embodiments where the zone identifier indicates that the data stored in the data block is not stored for the different zone (to which the data block has been reassigned), then the data stored in the data block may be ignored with respect to processing the access request. For instance, instead of reformatting or performing some other manipulation of the data stored in the previously written data block, the stored data may be ignored when new data is received and new metadata is generated for the new data. This new metadata may include the new zone indicator which indicates the different zone assigned to the previously written data block. The new data and the metadata generated for the new data may then be sent to the persistent storage device to store together in the previously written data block as performed by an individual write operation. Alternatively, the stored data may be ignored when a read operation or some other determination as part of the access request is made to the previously written data block. Thus, maintaining an error detection code in the data block itself along with other metadata may, in some embodiments, provide consistent protection from misidentifying reassigned data blocks as erroneous data blocks, and may, in some embodiments, prevent old, expired, or otherwise non-useful data from being used to service an access request As noted above, in some embodiments, data received for storage at a data store may be part of a larger data object, which may or may not be variably-sized. In order to store a variably-sized data object, some embodiments may implement a variety of techniques. FIG. 8 is a high-level flowchart of a method to implement self-describing data blocks of a minimum atomic write size for a variably-sized data object, according to some embodiments. As indicated at 810, in some embodiments, a data object may be received for storage in a log-structured data store that comprises at least one persistent storage device. The persistent storage device may comprises data blocks equivalent to a minimum atomic write size for the at least one persistent storage device.

The data object may be divided into one or more equally-sized portions that when each combined with a metadata portion, each combined portion equals the minimum atomic write size of the at least one persistent device, as indicated at 820. A remainder of the data object may also be created. For example, if the minimum atomic write size of the storage device is 4 kilobytes (4112 bytes) and the size of metadata to be stored with the equally-sized portion of data is 112 bytes, then the equally-sized portion of data may be 4000 bytes. This may ensure that the sum of the size of the data portion (4000 bytes) and the size of the metadata portion (112 bytes) equals the minimum write size (4112 bytes). Metadata may then be generated for the each of the equally-sized portions and the remainder that includes an error detection code for the equally-sized portion of the data or remainder of the data and the metadata, as indicated at 830. The one or more equally-sized portions of the data object and their respective metadata may then be sent to the at least one persistent storage device to store in data blocks assigned to a data zone, such as illustrated in FIG. 4 above, as indicated at 840. Similarly, the remainder of the data object and its respective metadata may be sent to the at least one persistent storage device to be stored together with other data for the log zone (e.g., log records for other data blocks) in a data block associated with a log zone, such as illustrated above in FIG. 4, as indicated at 850.

FIGS. 5 through 8, represent some of the many different methods and techniques for implementing and utilizing self-describing data blocks of a minimum write size for a data store, in various embodiments. They are not to be construed as limited to a particular arrangement or ordering of their elements. Similarly, multiple techniques may be performed together.

Figure 9:
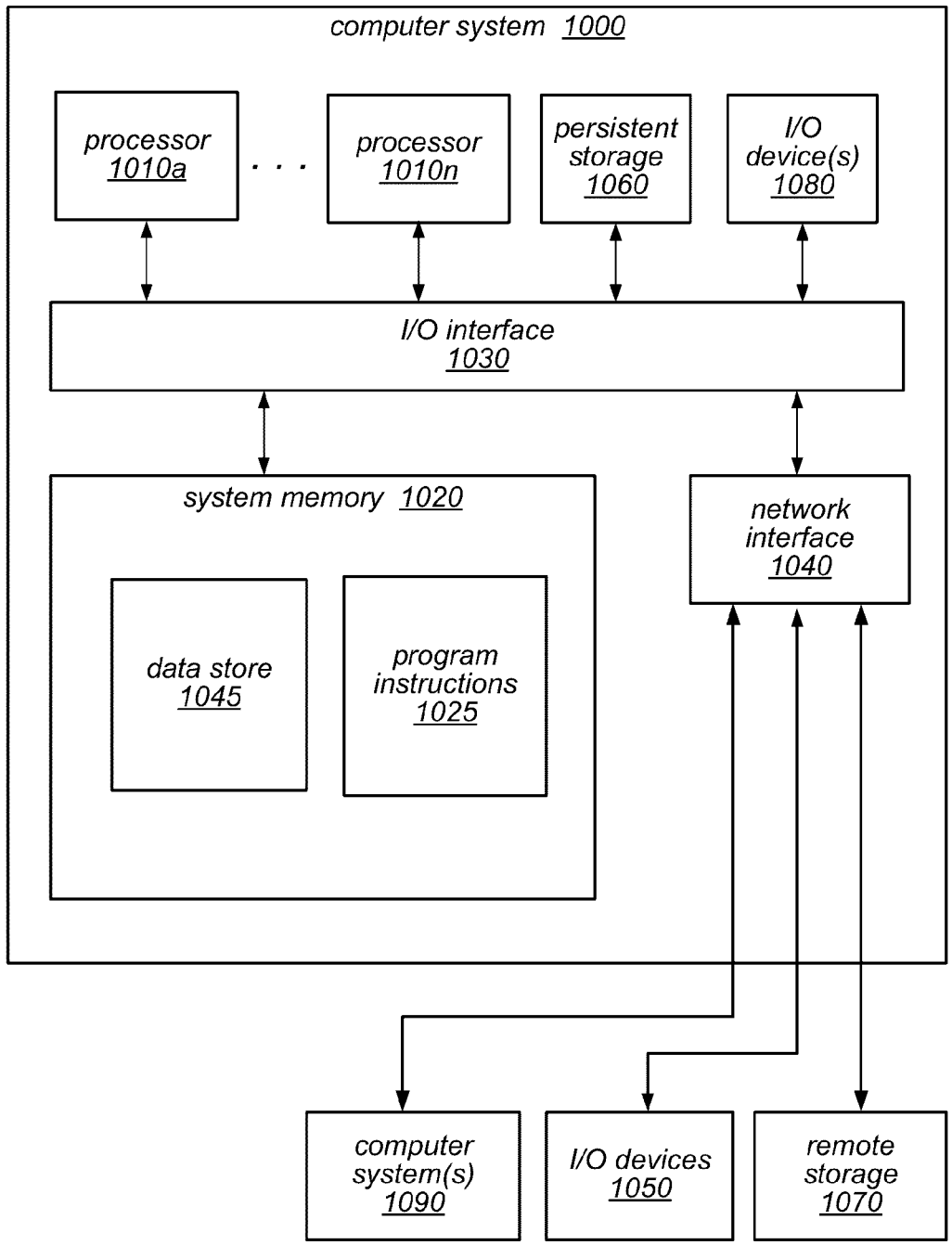
FIG. 9 is a block diagram illustrating a computer system configured to implement at least a portion of a database system that includes a database engine and a separate distributed database storage service, according to various embodiments.

FIG. 9 is a block diagram illustrating a computer system configured to implement at least a portion of the storage or database systems described herein, according to various embodiments. For example, computer system 1000 may be configured to implement a database engine head node of a database tier, or one of a plurality of storage nodes of a separate distributed database-optimized storage system that stores database tables and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed database-optimized storage system that stores database tables and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A method, comprising:
a storage node of a distributed storage service, comprising:
at least one persistent data storage device, comprising a plurality of data blocks equivalent to a minimum atomic write size of the at least one persistent storage device;
a storage manager implementing a data store, configured to:
access a data block of the plurality of data blocks as part of an operation utilizing data blocks assigned to a particular purpose, and wherein the access comprises:
read metadata stored in the data block, wherein the metadata was stored along with other contents of the data block within an individual atomic write operation to the data block by the at least one persistent storage device;
evaluate the metadata to determine that the data block is not erroneous and that an assigned purpose for the data block indicated by the metadata matches the particular purpose; and
in response to the determination that the data block is not erroneous and that the assigned purpose for the data block matches the particular purpose, include the data block as part of the operation.

2. The system of claim 1, wherein the operation is performed to service an access request for data stored in one of a plurality of zones in the data store, wherein data blocks assigned to the particular purpose are data blocks assigned to the one zone, wherein the metadata in the data block comprises a zone identifier indicating a zone assigned to the data block, and wherein to evaluate the metadata to determine that the assigned purpose for the data block included in the metadata matches the particular purpose, the storage manager is further configured to evaluate the zone identifier to determine that the assigned zone matches the one zone.

3. The system of claim 1, wherein the storage manager is further configured to:
access another data block of the plurality of data blocks as part of the operation utilizing data blocks assigned to the particular purpose, and wherein the accessing comprises:
read metadata stored in the other data block, wherein the metadata is stored within an individual atomic write operation to the other data block by the at least one persistent storage device;
evaluate the metadata to determine that an assigned purpose for the other data block indicated by the metadata does not match the particular purpose; and
in response to the determination that the assigned purpose for the other data block does not match the particular purpose, exclude the other data block from the operation.

4. The system of claim 1, wherein the operation is performed upon recovery of a system failure to detect an end of a log stored in the data store, wherein data blocks assigned to the particular purpose are data blocks assigned to store respective log records for the log, wherein the metadata in the data block comprises a block identifier indicating that the data block stores a portion of the log and a location of the data block in a logical sequence of at least some of the plurality of data blocks, wherein to evaluate the metadata to determine that the assigned purpose for the data block included in the metadata matches the particular purpose, the storage manager is configured to evaluate the identifier to determine that the data block stores the log record, and wherein the storage manager is further configured to:
perform the access for other ones of the plurality of data blocks as part of the operation;
evaluate block identifiers of those data blocks included in the operation, including the block identifier of the data block, to identify a data block with a highest block identifier that is contiguous with a previous block identifier as the end of the log.

5. The system of claim 1, wherein the storage manager is further configured to:
access another data block of the plurality of data blocks as part of the operation utilizing data blocks assigned to the particular purpose, and wherein the access comprises:
read metadata stored in the other data block, wherein the metadata is stored within an individual atomic write operation to the other data block by the at least one persistent storage device;
evaluate the metadata to determine that the other data block is erroneous; and
in response to the determination that that the other data block is erroneous, exclude the other data block from the operation.

6. The system of claim 1, wherein the storage manager is further configured to:
access another data block of the plurality of data blocks as part of the operation utilizing data blocks assigned to the particular purpose, and wherein the accessing comprises:
read metadata stored in the other data block, wherein the metadata is stored within an individual atomic write operation to the other data block by the at least one persistent storage device;
evaluate the metadata to determine that the other data block is erroneous; and
in response to the determination that that the other data block is erroneous, initiate a recovery operation to obtain data stored in the other data block.

7. A method, comprising:
performing, by one or more computing devices:
accessing a data block of the plurality of data blocks as part of an operation utilizing data blocks assigned to a particular purpose, wherein the plurality of data blocks are implemented as part of a persistent data store comprising at least one persistent storage device, and wherein the accessing comprises:
reading metadata stored in the data block, wherein the metadata was stored along with other contents of the data block within an individual atomic write operation to the data block by the at least one persistent storage device;
evaluating the metadata to determine that the data block is not erroneous and that an assigned purpose for the data block indicated by the metadata matches the particular purpose; and
in response to determining that the data block is not erroneous and that an assigned purpose for the data block matches the particular purpose, including the data block as part of the operation.

8. The method of claim 7, wherein the operation is performed to service an access request for data stored in one of a plurality of zones in the data store, wherein data blocks assigned to the particular purpose are data blocks assigned to the one zone, wherein the metadata in the data block comprises a zone identifier indicating a zone assigned to the data block, and wherein evaluating the metadata to determine that the assigned purpose for the data block included in the metadata matches the particular purpose comprises evaluating the zone identifier to determine that the assigned zone matches the one zone.

9. The method of claim 7, further comprising:
accessing another data block of the plurality of data blocks as part of the operation utilizing data blocks assigned to the particular purpose, and wherein the accessing comprises:
reading metadata stored in the other data block, wherein the metadata is stored within an individual atomic write operation to the other data block by the at least one persistent storage device;
evaluating the metadata to determine that an assigned purpose for the other data block indicated by the metadata does not match the particular purpose; and
in response to determining that the assigned purpose for the other data block does not match the particular purpose, excluding the other data block from the operation.

10. The method of claim 9, further comprising:
maintaining purpose assignments for the plurality of data blocks, wherein the purpose assignments indicate that the data block is assigned to the particular purpose and the other data block is assigned to a different purpose;
prior to performing the operation, modifying the purpose assignments to indicate that the other data block is assigned to the particular purpose;
wherein the operation identifies the data block and the other data block for accessing based on the purpose assignments;
wherein the metadata stored in the other data block indicates that the other data block is assigned to the different purpose.

11. The method of claim 7, wherein the operation is performed upon recovery of a system failure to detect an end of a log stored in the data store, wherein data blocks assigned to the particular purpose are data blocks assigned to store respective log records for the log, wherein the metadata in the data block comprises a block identifier indicating that the data block stores a portion of the log and a location of the data block in a logical sequence of at least some of the plurality of data blocks, wherein evaluating the metadata to determine that the assigned purpose for the data block included in the metadata matches the particular purpose comprises evaluating the identifier to determine that the data block stores the log record, and wherein the method further comprises:
performing said accessing for other ones of the plurality of data blocks as part of the operation;
evaluating block identifiers of those data blocks included in the operation, including the block identifier of the data block, to identify a data block with a highest block identifier that is contiguous with a previous block identifier as the end of the log.

12. The method of claim 7, further comprising:
accessing another data block of the plurality of data blocks as part of the operation utilizing data blocks assigned to the particular purpose, and wherein the accessing comprises:
reading metadata stored in the other data block, wherein the metadata is stored within an individual atomic write operation to the other data block by the at least one persistent storage device;
evaluating the metadata to determine that the other data block is erroneous; and
in response to determining that that the other data block is erroneous, excluding the other data block from the operation.

13. The method of claim 7, further comprising:
accessing another data block of the plurality of data blocks as part of the operation utilizing data blocks assigned to the particular purpose, and wherein the accessing comprises:
reading metadata stored in the other data block, wherein the metadata is stored within an individual atomic write operation to the other data block by the at least one persistent storage device;
evaluating the metadata to determine that the other data block is erroneous; and
in response to determining that that the other data block is erroneous, initiating a recovery operation to obtain data stored in the other data block.

14. A non-transitory, computer-readable storage medium, storing program instructions that when executed by one or more computing devices cause the one or more computing devices to implement:
accessing a data block of the plurality of data blocks as part of an operation utilizing data blocks assigned to a particular purpose, wherein the plurality of data blocks are implemented as part of a persistent data store comprising at least one persistent storage device, and wherein the accessing comprises:
reading metadata stored in the data block, wherein the metadata was stored along with other contents of the data block within an individual atomic write operation to the data block by the at least one persistent storage device;
evaluating the metadata to determine that the data block is not erroneous and that an assigned purpose for the data block indicated by the metadata matches the particular purpose; and
in response to determining that that the data block is not erroneous and that an assigned purpose for the data block matches the particular purpose, including the data block as part of the operation.

15. The non-transitory, computer-readable storage medium of claim 14, wherein the operation is performed to service an access request for data stored in one of a plurality of zones in the data store, wherein data blocks assigned to the particular purpose are data blocks assigned to the one zone, wherein the metadata in the data block comprises a zone identifier indicating a zone assigned to the data block, and wherein, in evaluating the metadata to determine that the assigned purpose for the data block included in the metadata matches the particular purpose, the program instructions cause the one more computing devices to implement evaluating the zone identifier to determine that the assigned zone matches the one zone.

16. The non-transitory, computer-readable storage medium of claim 14, wherein the program instructions cause the one or more computing devices to further implement:
accessing another data block of the plurality of data blocks as part of the operation utilizing data blocks assigned to the particular purpose, and wherein the accessing comprises:
reading metadata stored in the other data block, wherein the metadata was stored along with other contents of the data block within an individual atomic write operation to the data block by the at least one persistent storage device;

evaluating the metadata to determine that an assigned purpose for the other data block indicated by the metadata does not match the particular purpose; and in response to determining that the assigned purpose for the other data block does not match the particular purpose, excluding the other data block from the operation.

17. The non-transitory, computer-readable storage medium of claim 16, wherein the program instructions cause the one or more computing devices to further implement:

maintaining purpose assignments for the plurality of data blocks, wherein the purpose assignments indicate that the data block is assigned to the particular purpose and the other data block is assigned to a different purpose;

prior to performing the operation, modifying the purpose assignments to indicate that the other data block is assigned to the particular purpose;

wherein the operation identifies the data block and the other data block for accessing based on the purpose assignments;

wherein the metadata stored in the other data block indicates that the other data block is assigned to the different purpose.

18. The non-transitory, computer-readable storage medium of claim 14, wherein the operation is performed upon recovery of a system failure to detect an end of a log stored in the data store, wherein data blocks assigned to the particular purpose are data blocks assigned to store respective log records for the log, wherein the metadata in the data block comprises a block identifier indicating that the data block stores a portion of the log and a location of the data block in a logical sequence of at least some of the plurality of data blocks, wherein evaluating the metadata to determine that the assigned purpose for the data block included in the metadata matches the particular purpose comprises evaluating the identifier to determine that the data block stores the log record, and wherein the program instructions cause the one or more computing devices to further implement:

performing said accessing for other ones of the plurality of data blocks as part of the operation;

evaluating block identifiers of those data blocks included in the operation, including the block identifier of the data block, to identify a data block with a highest block identifier that is contiguous with a previous block identifier as the end of the log.

19. The non-transitory, computer-readable storage medium of claim 14, wherein the program instructions cause the one or more computing devices to further implement:

accessing another data block of the plurality of data blocks as part of the operation utilizing data blocks assigned to the particular purpose, and wherein the accessing comprises:

reading metadata stored in the other data block, wherein the metadata is stored within an individual atomic write operation to the other data block by the at least one persistent storage device;

evaluating the metadata to determine that the other data block is erroneous; and in response to determining that that the other data block is erroneous, excluding the other data block from the operation.

20. The non-transitory, computer-readable storage medium of claim 14, wherein the program instructions cause the one or more computing devices to further implement:

accessing another data block of the plurality of data blocks as part of the operation utilizing data blocks assigned to the particular purpose, and wherein the accessing comprises:

reading metadata stored in the other data block, wherein the metadata is stored within an individual atomic write operation to the other data block by the at least one persistent storage device;

evaluating the metadata to determine that the other data block is erroneous; and in response to determining that that the other data block is erroneous, initiating a recovery operation to obtain data stored in the other data block.

* * * * *